Jan. 16, 1951     A. J. EGGLESTON     2,538,357
KITCHEN TOOL
Filed Feb. 23, 1946
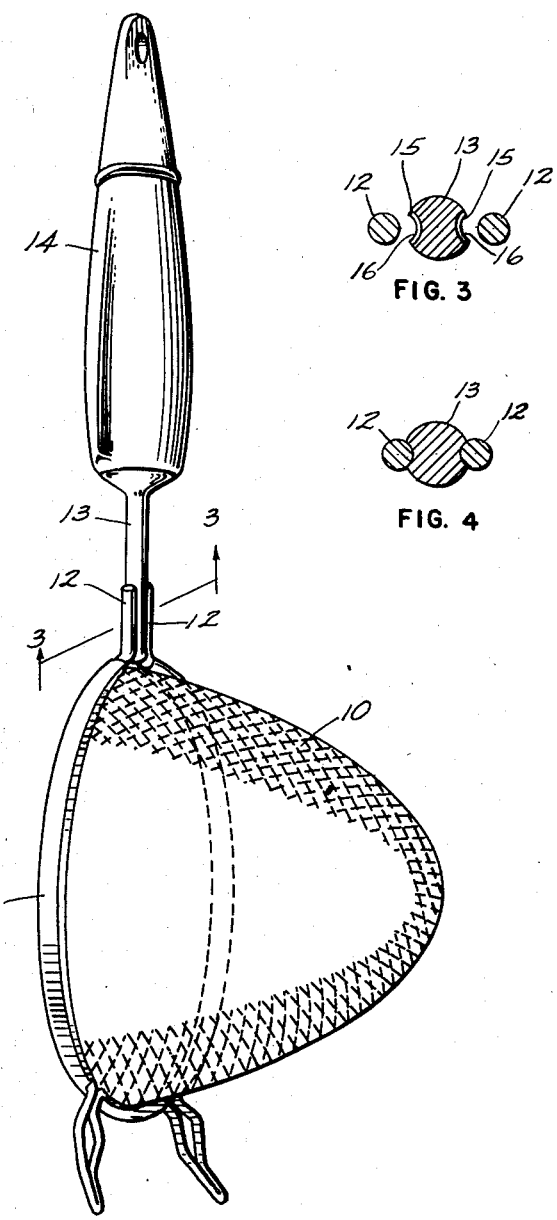
ALLEN J. EGGLESTON
INVENTOR
BY
Davis, Lindsey, Smith & Shonts
ATTORNEYS Patented Jan. 16, 1951

2,538,357

UNITED STATES PATENT OFFICE 2,538,357

KITCHEN TOOL

Allen J. Eggleston, Chicago, Ill., assignor to Ekco Products Company, Chicago, Ill., a corporation of Illinois Application February 23, 1946, Serial No. 649,644

1 Claim. (Cl. 219—10)

The invention relates generally to kitchen tools and more particularly to a kitchen tool of a type which includes a wire portion or frame with the two ends of the wire secured to the stalk or shank of a handle.

The general object of the invention is to provide a novel kitchen tool of the foregoing character, in which the wire frame is secured to the stalk in a manner tending to stiffen the wire and to hold it rigid with the stalk.

Another object is to provide a novel kitchen tool of the foregoing character, in which the end portions of the wire frame are welded to the stalk in a manner providing a neat, compact appearance and a rigid, relatively unbreakable as well as unbendable connection therebetween.

A further object is to provide a novel method of connecting the stalk and the wire frame of a kitchen tool of the foregoing character, which results in a compact and rigid connection therebetween.

Other objects and advantages will become apparent from the following description, taken in connection with the accompanying drawing, in which:

Figure 1 is a perspective view of one form of kitchen tool having a construction embodying the features of the invention.

Fig. 2 is an enlarged perspective view of one of the parts of the tool shown in Fig. 1.

Fig. 3 is a sectional view taken substantially on the line 3—3 of Fig. 1 but showing the relation of the parts before being secured together.

Fig. 4 is a view similar to Fig. 3 but showing the parts after being secured together.

As mentioned above, the invention relates to kitchen tools of a type which includes a wire frame portion with the two ends of the wire adapted to be secured to the stalk or shank of a handle. In Fig. 1 of the drawing, I have illustrated a strainer which has a wire frame of the type herein contemplated. The invention, however, is not limited to a strainer but also includes other types of tools having a wire frame portion, such as a vegetable masher, where the wire frame has a portion constituting the food-contacting portion of the tool. The invention thus relates not to the particular use for which the tool is adapted, but to the mode of securing certain parts thereof together.

The strainer, shown in Fig. 1 for illustrative purposes, comprises a wire mesh portion 10 secured to an annular frame 11 which includes a wire, the ends of which are indicated at 12. The ends 12 are adapted to be rigidly secured to one end of a stalk 13, the other end of which is constructed for attachment to a handle 14.

The present invention relates particularly to the mode of securing the ends 12 to the stalk 13 so that they are rigidly held together without any danger of being bent or becoming detached, the union therebetween being such as to have a neat, compact appearance. The connection between the ends 12 and stalk 13 is preferably provided by welding, and is such that a substantial portion of the length of the ends 12 is rigidly secured to the stalk 13. By securing a substantial portion of the length of the ends to the stalk, the wire of the frame is thereby stiffened and the chance of its being broken away from the stalk is thereby minimized.

In the particular embodiment shown in the drawing, I form the end of the stalk with a pair of grooves 15 on opposite sides of the stalk and extending lengthwise thereof. The grooves 15 are of a cross-sectional contour conforming to the contour of the wire ends 12. Thus, as illustrated in the drawing, where the wire ends 12 are of round cross section, the grooves 15 have an arcuate, transverse contour, as is clearly illustrated in Fig. 3. The ends 12 of the wire are bent into parallel relation with one another and thus may fit into the grooves when in assembled relation therewith.

Since electric resistance welding is the preferred method of securing the ends 12 to the stalk 13, electric current concentrating means is provided within the grooves so that the weld may be practicably performed. In the present instance, the current concentrating means comprises a pair of ribs 16 in each groove extending transversely thereof. The ribs 16 are longitudinally spaced so that, when welded to the ends 12, a substantial portion of the length of the latter will be rigidly secured to the stalk 13. The ribs 16 follow the contour of the grooves 15 and thus, in the present instance, are arcuate in form, as shown in Fig. 3.

In the welding operation, the ends 12 are placed in the respective grooves in contact with the ribs 16 and, while the welding current is applied, pressure is exerted to force the ends 12 into the grooves. As a welding heat is attained, the ribs 16, as an incident to welding them to ends 12, become sufficiently plastic to flatten out so that the ends 12 in their eventual position fit snugly within the grooves 15. Thus, because of the longitudinal spacing of the ribs 16, the entire portion of the ends 12 between the ribs is rigidly secured to the stalk 13.

With the wire frame welded to the stalk 13 in the foregoing manner, a neat, compact appearance is obtained since the ends 12 of the wire frame are partially embedded within the cross-sectional area of the stalk 13. The ends of the wire frame and the stalk are rigidly held together in a relatively unbreakable as well as unbendable manner, since a substantial portion of the length of said ends is rigidly secured to the stalk. It is evident that, while I have illustrated the invention in connection with a strainer, any kitchen tool which has a wire frame portion with the two ends of the wire adapted to be secured to a stalk may be made in accordance with the disclosure herein and consequently falls within the scope of the invention.

I claim:

The method of securing a bent wire frame of a kitchen tool to a handle stalk, said frame and stalk being conductors of electric current and being of substantially circular cross section, which comprises bending the ends of the wire frame into parallel relation to each other, forming a pair of longitudinally extending grooves in opposite sides of the stalk, the grooves being of arcuate cross section to conform to the cross-sectional contour of said ends, providing a pair of transverse longitudinally spaced current-concentrating ribs in each of said grooves with the ribs following the cross-sectional contour of the grooves and extending over substantially the entire circumference thereof, placing the ends of the wire frame in said grooves in engagement with said ribs, and securing said stalk to said ends by electric resistance welding under pressure whereby said ribs are flattened to form welded areas of corresponding extent and each of said ends is thereby rigidly secured to the stalk from one rib to the other in snugly fitting recessed relation within said grooves for resisting relative twisting movement between said ends and said stalk longitudinally of the tool.

ALLEN J. EGGLESTON.

REFERENCES CITED

The following references are of record in the file of this patent:

UNITED STATES PATENTS

| Number | Name | Date |
| --- | --- | --- |
| 979,970 | Lachman | Dec. 27, 1910 |
| 1,133,806 | Lachman | Mar. 30, 1915 |
| 1,173,721 | Hurvitz | Feb. 29, 1916 |
| 2,205,706 | Wolff | June 25, 1940 |
| 2,299,001 | Anderson | Oct. 13, 1942 |
| 2,357,438 | Tomlinson | Sept. 5, 1944 |